United States Patent [19]
Sugiura

[11] Patent Number: 6,050,856
[45] Date of Patent: Apr. 18, 2000

[54] ELECTRICAL JUNCTION BOX HAVING A SCREW-TIGHTENING TYPE FUSIBLE LINK

[75] Inventor: Tomohiro Sugiura, Shizuoka, Japan

[73] Assignee: Yazaki Corporation, Tokyo, Japan

[21] Appl. No.: 09/032,113

[22] Filed: Feb. 27, 1998

[30] Foreign Application Priority Data

Mar. 4, 1997 [JP] Japan ................................. 9-049222

[51] Int. Cl.[7] ................................................. H01R 13/68
[52] U.S. Cl. ........................................ 439/621; 439/949
[58] Field of Search ................................. 439/949, 76.2, 439/621, 801

[56] References Cited

U.S. PATENT DOCUMENTS

| | | | |
|---|---|---|---|
| 5,752,856 | 5/1998 | Boutin et al. | 439/621 |
| 5,816,858 | 10/1998 | Kazarian et al. | 439/621 |
| 5,817,976 | 10/1998 | Yanese et al. | 439/621 |

FOREIGN PATENT DOCUMENTS 63-127055  8/1988  Japan .............................. H01H 85/56

*Primary Examiner*—Paula Bradley
*Assistant Examiner*—Katrina Davis

*Attorney, Agent, or Firm*—Sughrue, Mion, Zinn Macpeak & Seas, PLLC

[57] ABSTRACT

An electrical junction box having a screw-tightening type fusible link. The electrical junction box includes a screw-tightening type fusible link having at least one pair of terminals, a first electrical junction box having a housing for mounting the screw-tightening type fusible link and a recess portion which is adjacent to the housing for mounting the screw-tightening type fusible link, a second electrical junction box which can be mounted in the recess portion of the first electrical junction box, at least one wire harness in which one end of the wire harness is securely tightened to the terminal of screw-tightening type fusible link by a bolt, and an operation space for tightening where the bolt, the operation space is defined so as to be identical with the recess portion of the first electrical junction box before the second electrical junction box is mounted. The electrical junction box further includes at least one housing disposed on the top face of said first electrical junction box for mounting a fusible link used for a load, and at least one bus bar disposed inside the first electrical junction box for connecting the terminal of screw-tightening type fusible link with the housing for mounting the fusible link used for the load, wherein the housing for mounting the screw-tightening type fusible link is disposed in a configuration such that the bus bar is shaped so as to be straight or so as to be bent at only one point.

8 Claims, 7 Drawing Sheets

ELECTRICAL JUNCTION BOX HAVING A SCREW-TIGHTENING TYPE FUSIBLE LINK

BACKGROUND OF THE INVENTION

1. Technical Field of the Invention

The present invention relates to a electrical junction box in which a screw-tightening type fusible link, external relay boxes or the like are attachable to a junction box main body in which various kinds of wiring members are provided.

2. Background of Related Art

Nowadays, automobiles include different kinds of electrical parts to control driving thereof including, for instance, relay switches, fusible links and so on. The electrical parts are mounted on an electrical junction box, and the electrical junction box and electrical devices are connected by wire harnesses. Although there are various kinds of structures for such an electrical junction box, the following is a description of a mounting structure of a screw-tightening type fusible link disclosed in the Unexamined Japanese Utility Model Publication Sho. 63-127055, with reference to FIGS. 6–8.

On a top face of a main body 51 of a junction box as shown in FIG. 6, a plurality of housings 52 for mounting relays, a plurality of housing 53b for mounting fusible links and a housing 53a for mounting a fusible link are formed.

At a corner of the main body 51, an outer corner wall 54 which is inclined with respect to outer walls 51a, 51b is formed, and a projected portion 55 is formed so as to be perpendicular to the outer corner wall 54. An external relay box mounting housing 53a is provided in a position corresponding to the projected portion 55 on a top face of the main body 51. Nut members 56a, 56b are adherely fixed on both sides of the projected portion 55 in a predetermined position under the fusible link mounting housing 53a as shown in FIG. 8. Further, a bus bar 57 is provided on the nut member 56a in one side of the projected portion 55. The bus bar 57 is branched off and lead to the fusible link mounting housings 53b.

A fusible link 58 shown in FIG. 6 is a screw-tightening type which is used when a high current-carrying capacity in a range of 60–100 A is required. For the case of a low current-carrying capacity in a range of 30–50 A, a terminal-engaging type fusible link is used. On a lower face of the fusible link 58, two leg portions 59a, 59b are projectingly provided, and screw holes 60a, 60b for screw-tightening are formed respectively in each of the leg portions 59a, 59b.

When the fusible link 58 is mounted onto the fusible link mounting housing 53a, the leg portions 59a, 59b pierce through a bottom of the housing 53a and are positioned at both ends of the projected portion 55. After that, the screw hole 60a in one leg portion 59a is met with the nut member 56a of the projected portion 55, and a predetermined wiring, namely, a circular terminal 61a of wire harness, is secured with a bolt 62 onto the nut portion 56a through the bus bar 57. As a result, the leg portion 59a, the bus bar 57 and circular terminal 61a are electrically connected.

Besides, another circular terminal 61b of the wire harness that is connected to loads is connected with the other leg portion 59b by securing the other nut member 56b with a bolt 62. To secure the nut members 56a, 56b with the bolts 62, 62, a monkey wrench shown in FIG. 6 or an impact wrench 64 shown in FIG. 8 is utilized.

In the conventional mounting structure of fusible link, other parts such as an external relay box, a battery, an air cleaner or the like are disposed in the vicinity of the main body 51 and the wire harnesses having the circular terminals 61a, 61b are connected with such parts. Hence, when the electric junction box is disposed in a automobile, it is necessary to provide a space for operating the monkey wrench 63 in the vicinity of an arrow A if the monkey wrench 63 is utilized for tightening the bolt 62. If the impact wrench 64 is utilized for the tightening, it is necessary to provide a space as well in the vicinity of an arrow B.

In the conventional electrical junction box, however, there are some cases where the impact wrench 64 or the like cannot be used because it falls on other parts such as the battery and so on and, thus, keeping the operation space becomes impossible.

In such a case, it is necessary to change the order of disposing the electrical junction box into the automobile, thus causing compromises in operational efficiency due to the necessity of changing design or assembling process.

Other then securing the circular terminals with the bolts, utilizing a connector to connect one wire harness with the other harness can be proposed. In such a case, however, the number of heavy wires or connectors is increased and then manufacturing costs are raised.

Furthermore, in this structure, it is necessary to bend the bus bars 57 many at many locations to connect the housing 53b with the leg portion 59a, 59b of the fusible link 58, as indicated by dotted lines in FIG. 7. Such bending formations of the bus bars 57 require accurate size control. If there are some size errors, there is fear that the bus bars 57 cannot be engaged with the main body 51. It causes some problems such as delay of operation or decreasing of manufacturing yield.

SUMMARY OF THE INVENTION

The object of the present invention are to provide an electrical junction box having a screw-tightening type fusible link in which the electrical junction box and a wire harness is easily connected without providing special operation space when the electrical junction box is mounted into a automobile.

The other object of the present invention is to provide the electrical junction box having a screw-tightening type fusible link in which housings for mounting fusible links for loads is disposed in a configuration such that shapes of bus bars connecting to the housing with external connection terminal of the screw-tightening type fusible link can be simplified.

To achieve the above object, according to present invention, there is provided an electrical junction box which comprising a screw-tightening type fusible link having at least one pair of terminals, a first electrical junction box having a housing for mounting the screw-tightening type fusible link and a recess portion which is adjacent to the housing for mounting the screw-tightening type fusible link, a second electrical junction box which can be mounted on the recess portion of the first electrical junction box, at least one wire harness in which one end of the wire harness is securely tightened to the terminal of screw-tightening type fusible link by a bolt, and an operation space for tightening the bolt, wherein the operation space is defined so as to be identical with the recess portion of the first electrical junction box before the second electrical junction box is mounted. Therefore, when the wire harnesses are connected to the screw-tightening type fusible link mounted on the housing for the fusible link, tools such as the impact wrench or the like can be operable while utilizing the recess portion.

According to another aspect of the present invention, the electrical junction box further comprises at least one housing disposed on the top face of said first electrical junction box for mounting a fusible link used for a load, and at least one bus bar disposed inside the first electrical junction box for connecting the terminal of screw-tightening type fusible link with the housing for mounting the fusible link used for the load, wherein the housing for mounting the screw-tightening type fusible link is disposed in a configuration such that the bus bar is shaped so as to be straight or so as to be bent at only one point. Therefore, the shape of bus bar can be simplified.

DETAILED DESCRIPTION OF THE EMBODIMENT

Figure 1:
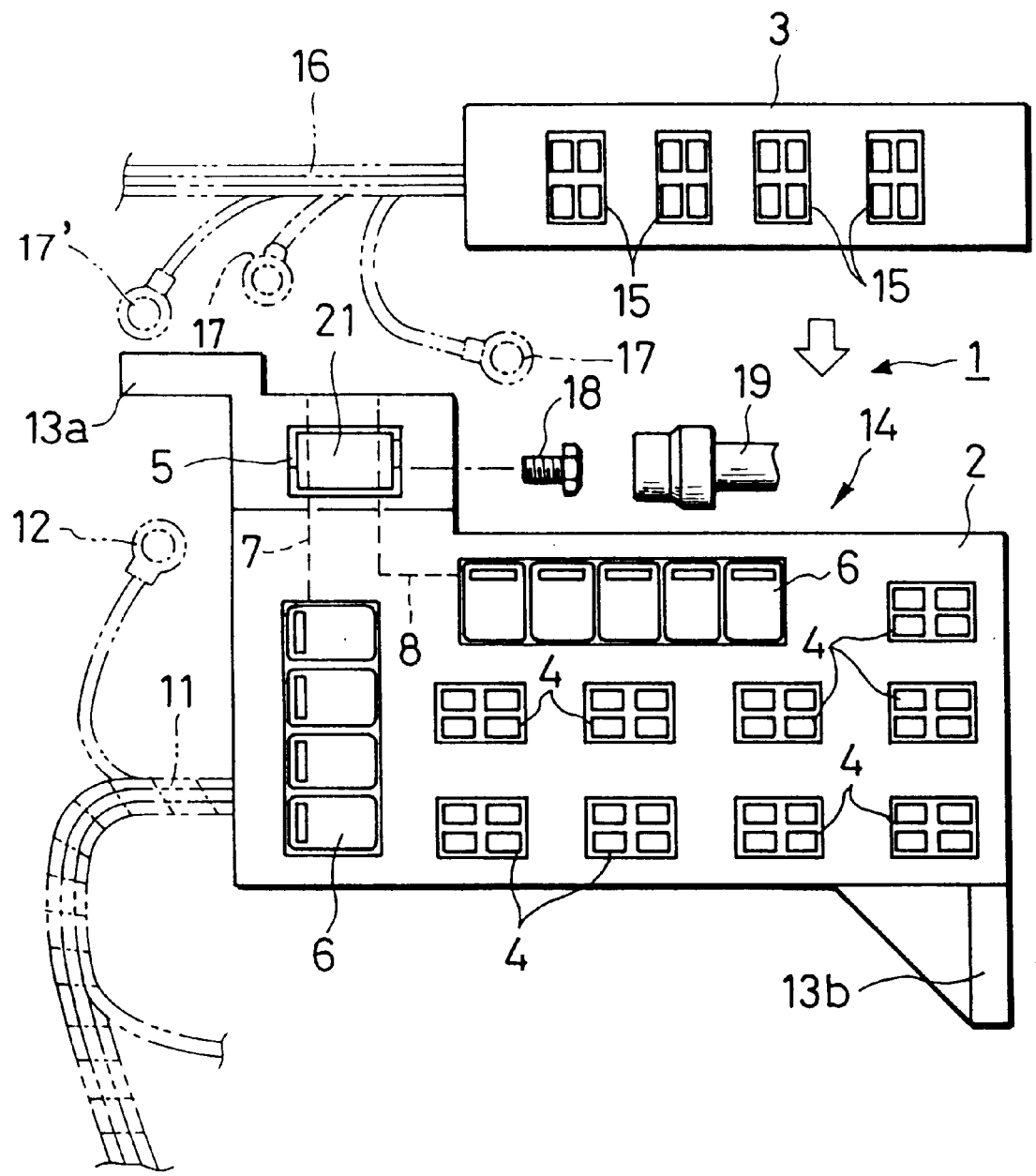
FIG. 1 is a plan view showing the first embodiment of an electrical junction box having a screw-tightening fusible link according to the present invention.
Figure 2:
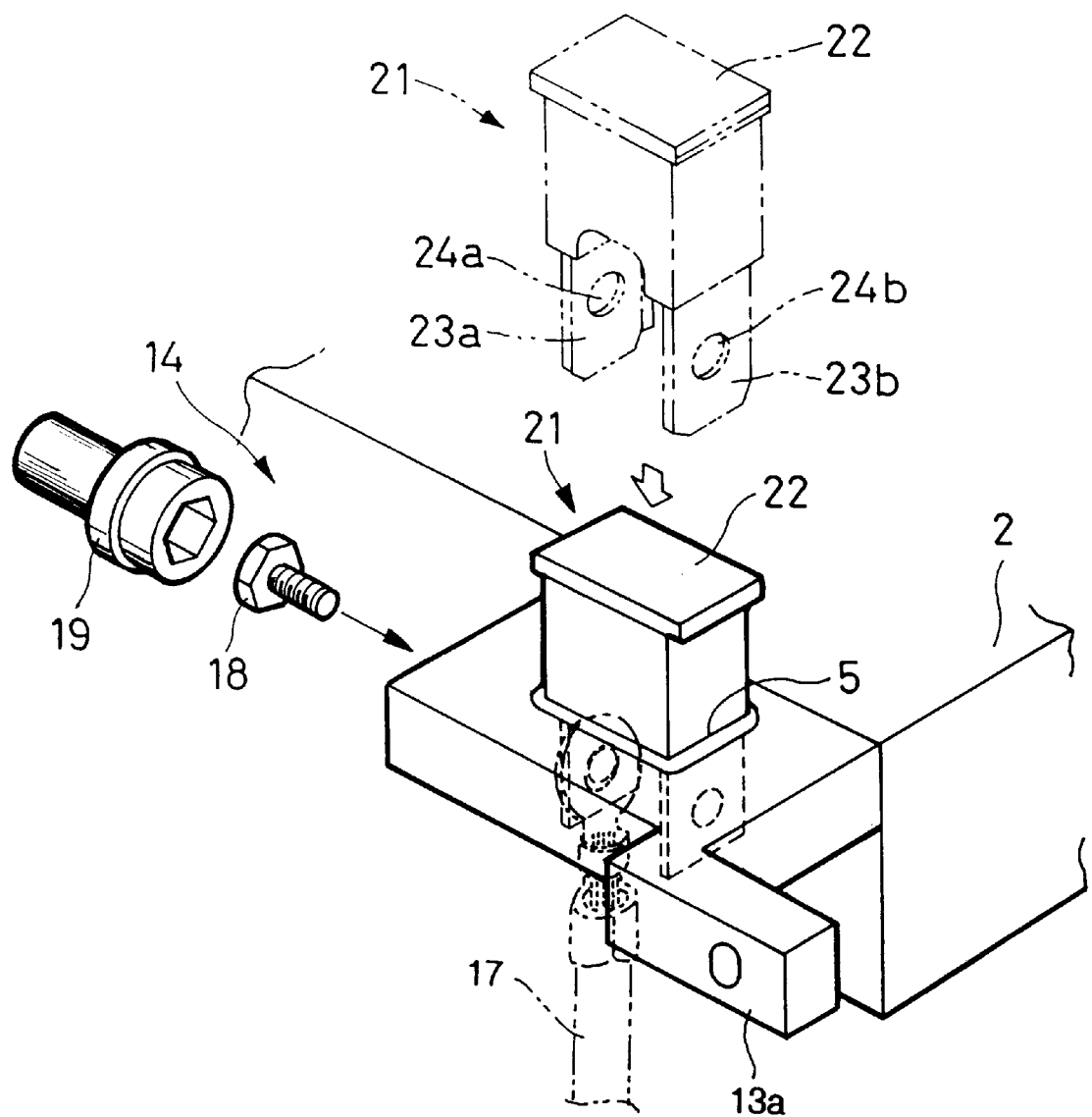
FIG. 2 is a perspective view of an essential part of the electrical junction box showing connection between a fusible link and a wire harness of FIG. 1.
Figure 3:
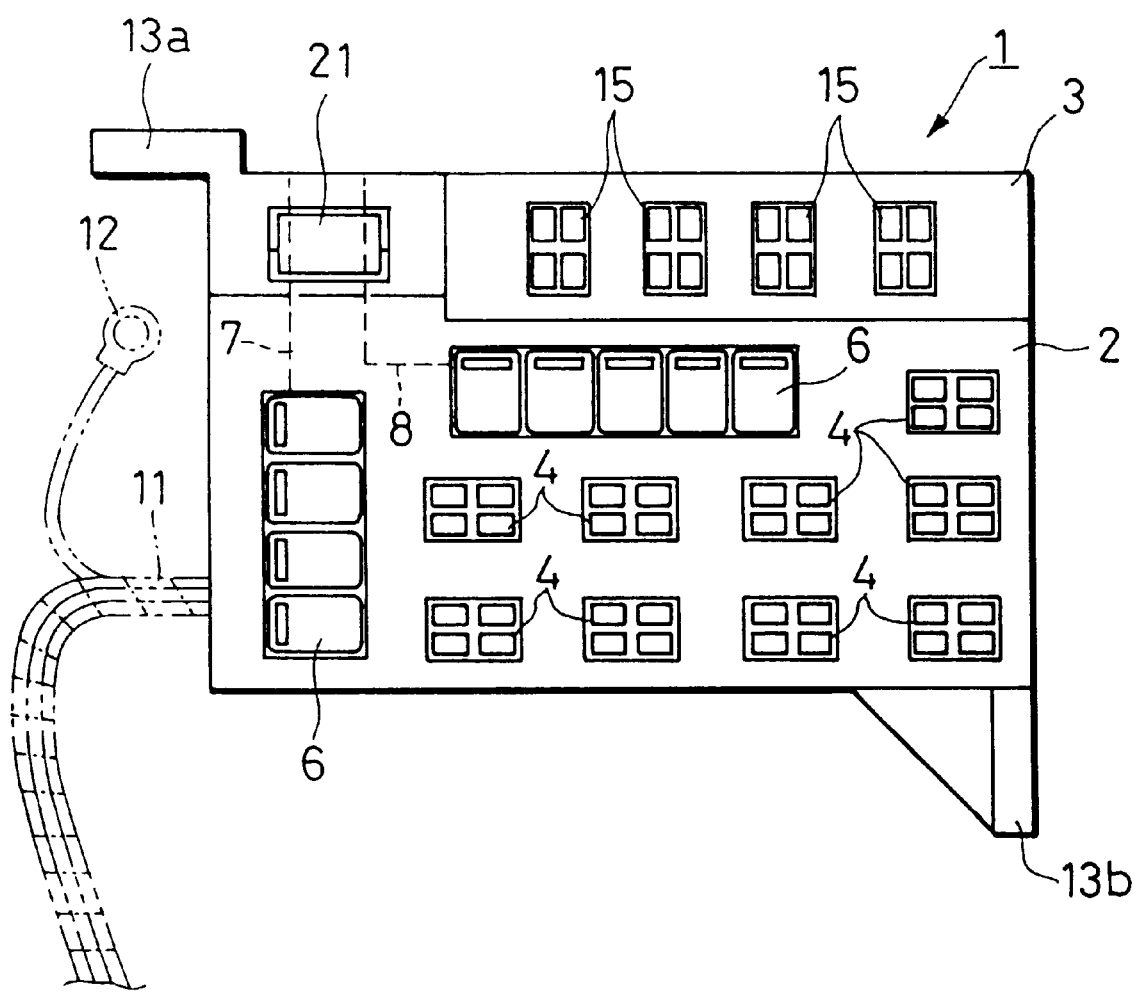
FIG. 3 is a plan view showing a state that an external relay box is mounted on the electrical junction box of FIG. 1.

Now, description will be given below in detail of the first embodiment of an electrical junction box having a screw-tightening type fusible link (hereinafter, for short, electrical junction box) according to the present invention with reference to FIGS. 1 to 3. FIG. 1 is a plan view showing the structure of the electrical junction box according to the present invention. FIG. 2 is a perspective view of an essential part of the electrical junction box showing the structure thereof. FIG. 3 is a plan view showing an example of an assembled electrical junction box. The figures used to describe the conventional art will be quoted appropriately to explain embodiments of the present invention.

As shown in FIGS. 1 and 3, the electrical junction box 1 in this embodiment includes a main body 2 and a relay box 3. On a top face of the main body 2, are a plurality of housings 4 for mounting relays, a housing 5 for mounting a screw-tightening type fusible link 21 (will be described later), and a plurality of housings 6 for mounting terminal-engaging type fusible links are disposed.

In a lower portion of the main body 2, bus bars 7, 8 are disposed between the fusible link mounting housings 5 and 6 as indicated by dotted lines in FIGS. 1 and 3. From the lower portion of the main body 2, wire harness 11 are extended, and one of the end of the wire harness 11 is connected with connection terminals provided on housings 4 for mounting relays or the fusible link mounting housing 6. Provided the other end of the wire harnesses 11 are circular terminals 12 having a bolt hole or connector terminals (not shown)is.

In addition, on outer side portions of the main body 2, fixing members 13a, 13b having screw holes (not shown) for fixing the main body 2 onto an engine room of automobile are provided. One of the external electric devices in the engine room can be mounted onto the main body 2 and a recess portion 14 for engaging the relay box 3 or the like is formed, as well, on the outer side portion of main body 2.

Shapes and positions of the fixing members 13a, 13b and the recess portion 14 not restricted to this embodiment and may be changed suitably according to specifications of the automobile.

Here, the relay box 3 is formed in a box-shaped with the size and shape thereof set so as to be able to engage with the recess portion 14. On a top face of the relay box 3, a plurality of housings 15 for mounting relays are disposed. Each of housings 15 has a connection terminal and one end of the wire harness 16 are connected thereon respectively.

Further, on the other ends of wire harness 16, are connection terminals 17 of the fusible link 21 (will be described later), circular terminals 17' secured with screws onto other electronic devices or the like are connected appropriately. The fusible link 21 is substantially the same as that in the conventional art. As shown in FIG. 2, two terminals 23a, 23b for external connection are provided on a lower portion of a housing 22. Each of the terminals 23a, 23b is substantially plate-shaped, and screw holes 24a, 24b for tightening are formed at substantial center thereof.

Next, the technique of mounting the fusible link 21 onto the main body 2 will be described. From a position indicated by phantom line to a portion indicated by solid line as shown in FIG. 2, the fusible link 21 is inserted into the mounting housing 5, and thereby the external connection terminals 23a, 23b are positioned along with the bus bars 7, 8 as shown in FIG. 1.

In this state, as shown in FIGS. 1 and 2, there is formed the recess portion 14 in an outer side of the external connection terminal 23a, and so that it is possible to obtain an operation space for tightening a bolt 18 onto a nut member. Therefore, utilizing the recess portion 14, it is possible to position the one circular terminal 17 and to screw-tighten the terminal 17 with the bolt 18 by use of an impact wrench 19.

With regard to the other external connection terminal 23b, the other circular terminal 17 (not shown) is tightened with the bolt 18 (not shown) by the impact wrench 19 from the outside of the main body 2. Although an operation space for the screw-tightening is needed outside of the main body 2, the space can be much smaller than that of the conventional electrical junction box.

After the tightening of the bolt 18, as shown in FIG. 3, the relay box 3 is engaged with the recess portion 14. At that time, the connection of the circular terminal 17 and mounting the relay box 3 onto the main body 2 is completed. In this manner, on the manufacturing line of the automobile, the electric junction box 1 can be mounted in the automobile without regard to existence of other parts, for instance, a battery or the like. Therefore, it can be previously avoided the process change due to disablement of the mounting.

In the main body 2 as described above, the housing 5 for mounting the screw-tightening type fusible link is disposed so as to be juxtapose with one housing 6 for mounting the terminal-engaging type fusible link and so as to be perpendicular to the other housing 6. In this configuration, the bus bar 7 can be straight as indicated by the dotted line in FIGS. 1 and 2, and the bus bar 8 can be shaped so as to be bent only once.

Therefore, in this embodiment, since it is not necessary to bend the bus bar complexly such as the prior art and thus the size control is simplified, inferior engagement of the bus bars can be avoided, and thereby the operation efficiency and the manufacturing yield can be improved.

Figure 4:
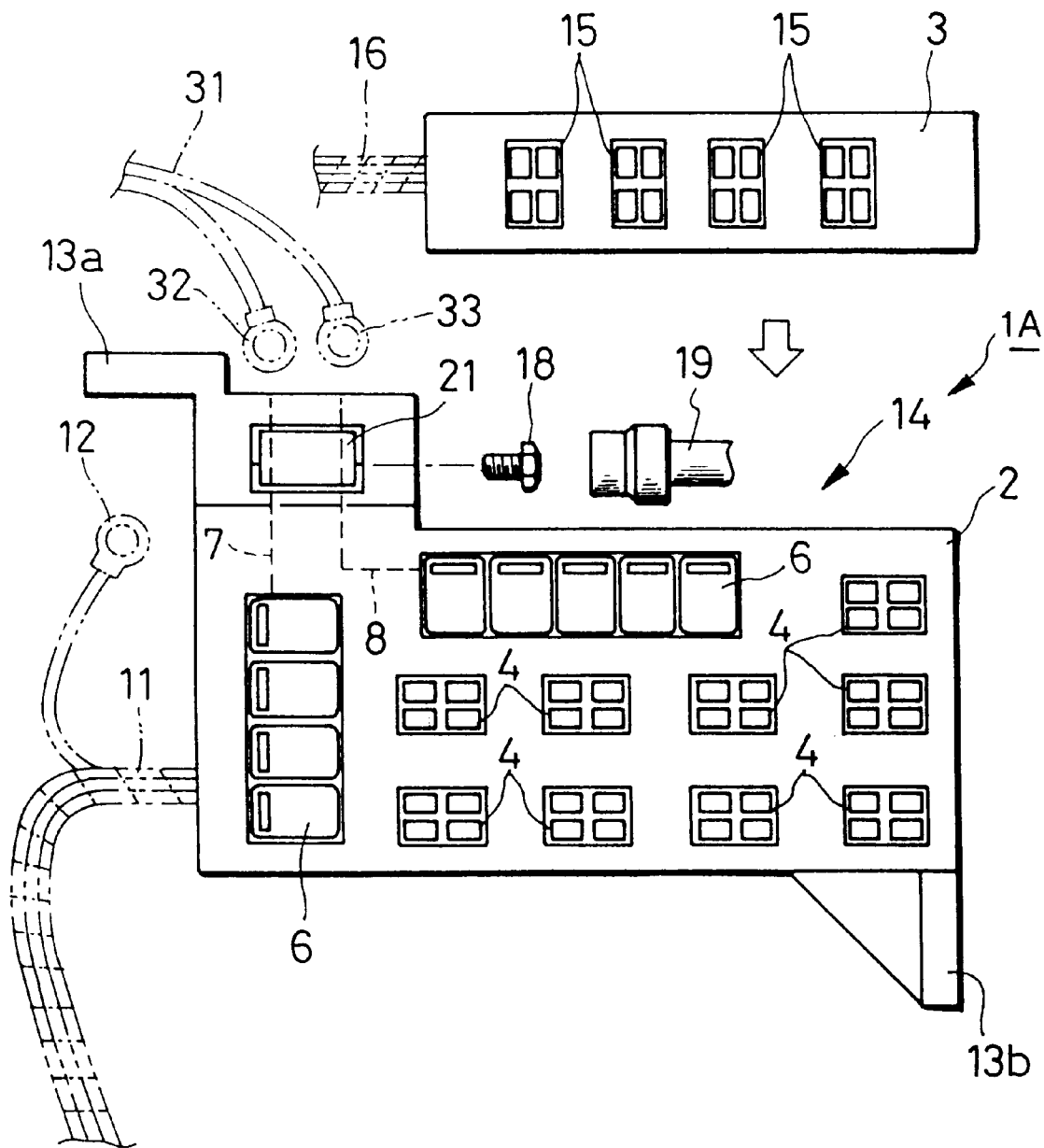
FIG. 4 is a plan view showing the second embodiment of an electrical junction box having a screw-tightening fusible link according to the present invention.
Figure 5:
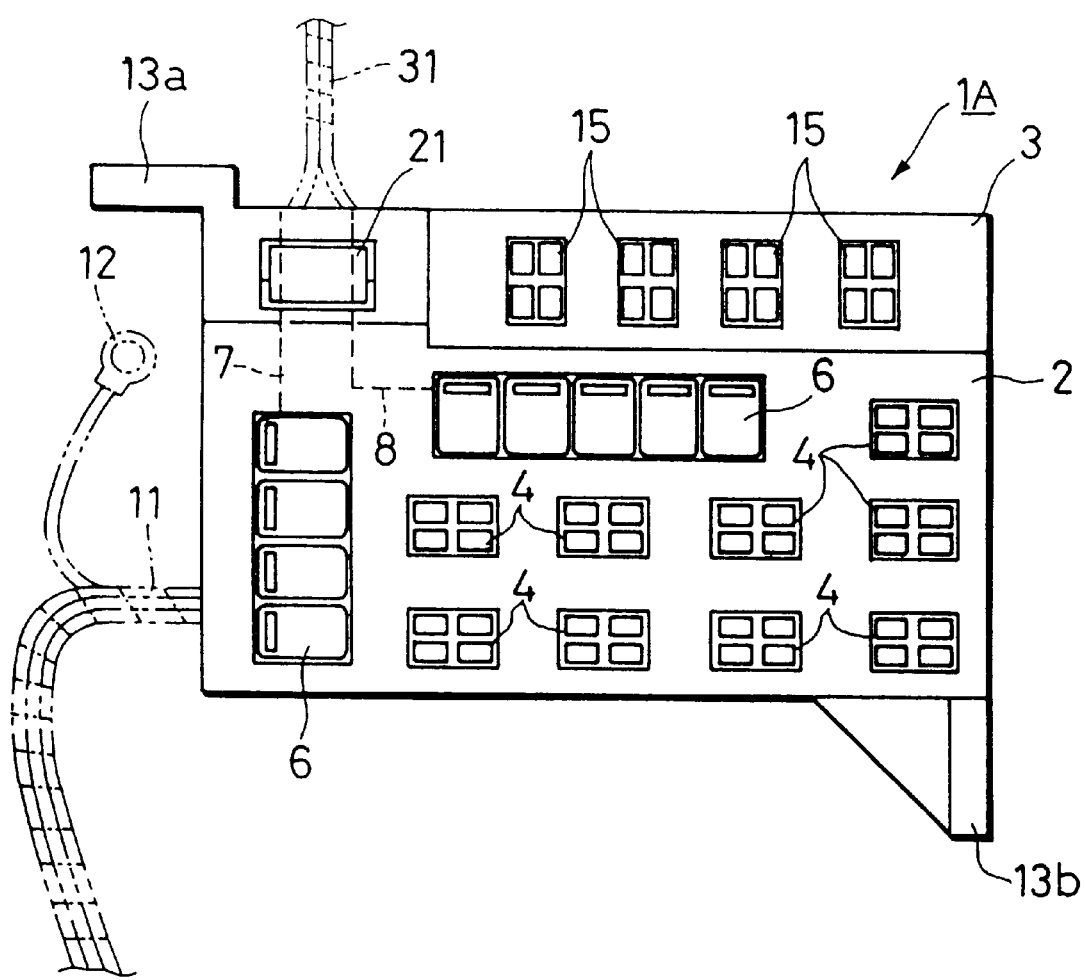
FIG. 5 is a plan view showing a state that an external relay box is mounted on the electrical junction box of FIG. 4.
Figure 6:
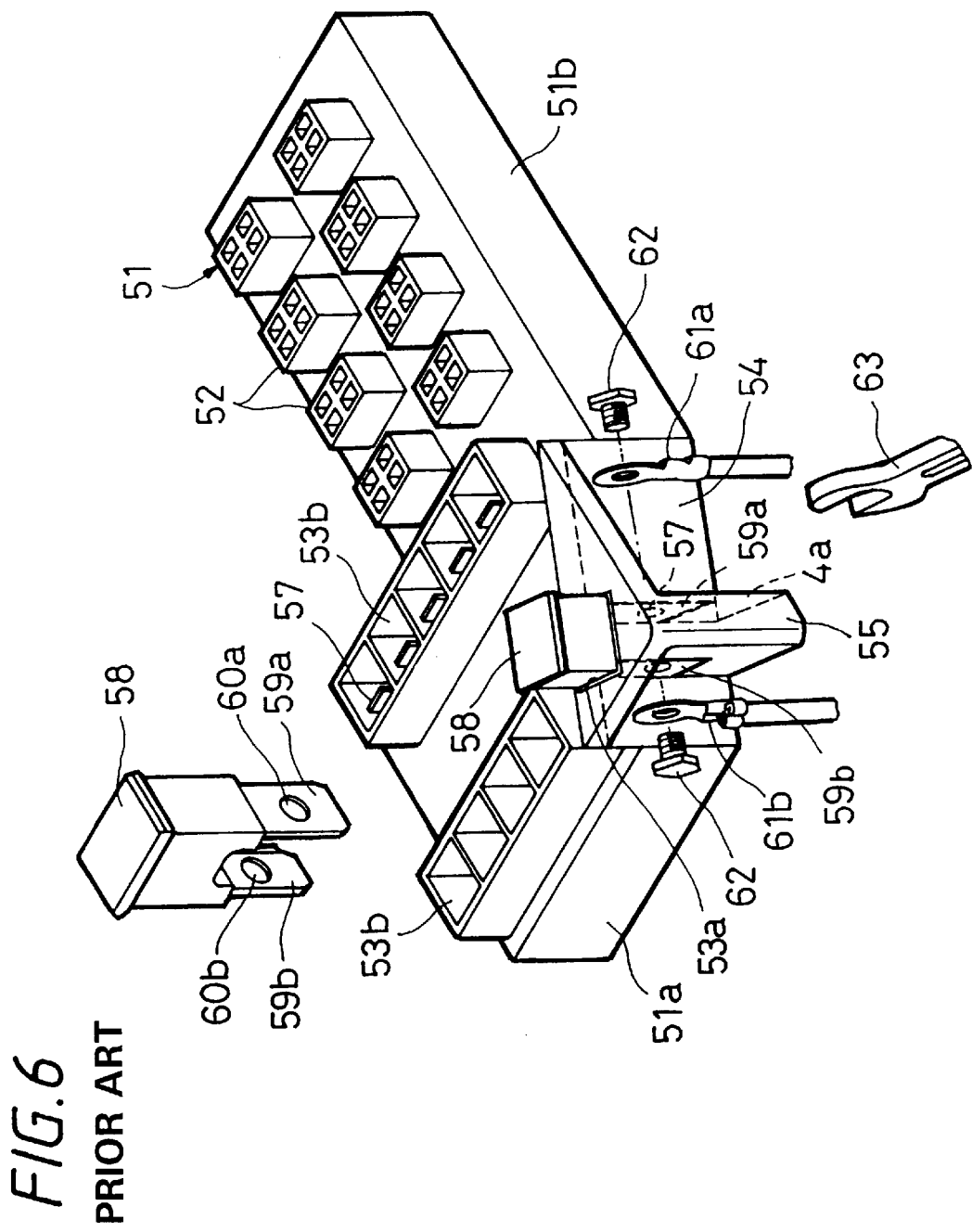
FIG. 6 is a perspective view showing a conventional electrical junction box.
Figure 7:
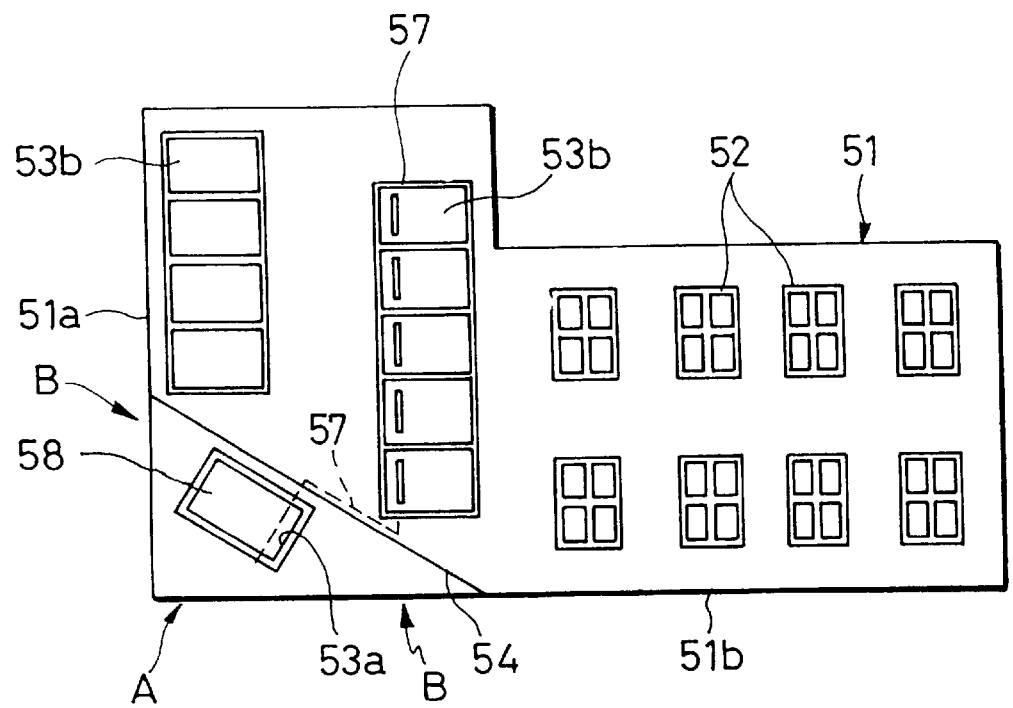
FIG. 7 is a plan view showing the structure of the electrical junction box of FIG. 6.
Figure 8:
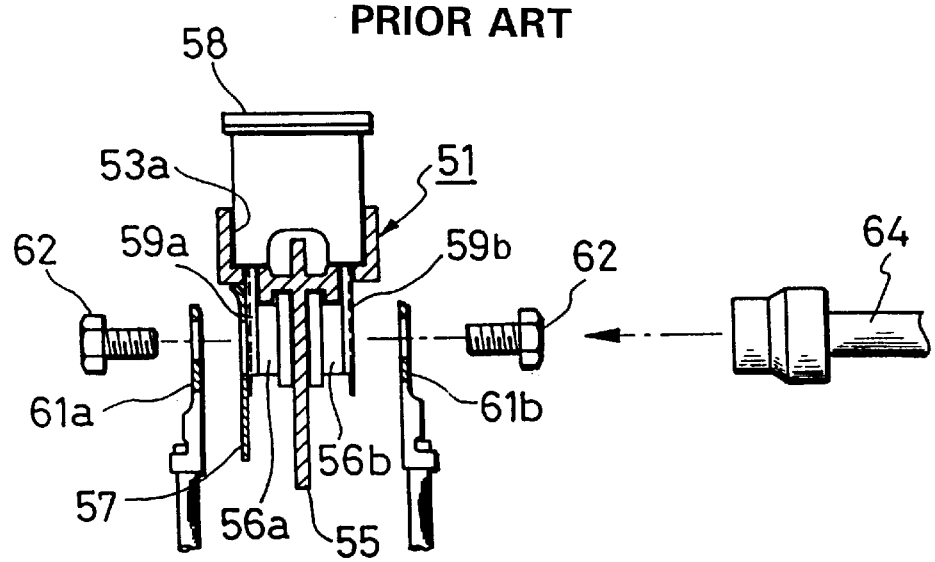
FIG. 8 is a section view of the main essential part of the conventional electrical junction box showing connection between a fusible link and a wire harness of FIG. 6.

Next, the second embodiment of the electrical junction box according to the present invention will be described below with reference to FIGS. 4 and 5. Parts similar to those previously described with reference to the first embodiment are denoted by the same reference numerals.

Wire harness 31 is not connected to the relay box 3 but the other electronic devices or the battery. Circular terminals 32, 33 are respectively connected with the wire harnesses 31. When the circular terminals 32, 33 are connected with the screw-tightening type fusible link 21, the circular terminals 32, 33 are connected from outside of the external connection terminals 23a, 23b (cf. FIG. 2) or from the direction as shown in FIG. 4 at first. Then the circular terminal 33 is tightened by the impact wrench 19 while utilizing the recess portion 14 as in the first embodiment, and the circular terminal 32 is tightened by the impact wrench 19 from the outside of the main body 2.

After the circular terminals 32, 33 are connected with the external connection terminals 23a, 23b of the screw-tightening type fusible link 21, the relay box 3 is engaged with the recess portion 14. Although the recess portion 14 is consumed by mounting the relay box 3, the positioning of the electric junction box 1 can be achieved easily because the circular terminal 33 has already been connected.

Besides, configurations of the bus bars 7, 8 in this embodiment are similar to the first embodiment, and thereby can be disposed easily.

As described the above, in the electrical junction box having a screw-tightening type fusible link according to the present invention, the recess portion for the relay box or the like is formed in the part of the main body and the housing for mounting the screw-tightening type fusible link is disposed in the position where is adjacent to the recess portion. Thus, when the wire harnesses are connected to the screw-tightening type fusible link mounted on the housing for the fusible link, tools such as the impact wrench or the like can be operable by utilizing the recess portion. The external electric device can be mounted onto the recess portion after the connection.

Therefore, it is not necessary to provide the operation space for connecting the wire harnesses in the manufacturing line of automobile, to change the design or parts configuration of the electrical junction box and assembling process, so that the operation efficiency and the generality of electrical junction box can be improved.

Further, the structure of bus bars in the electrical junction box is simplified, so that the manufacturing yield can be improved and thus the costs can be went down.

What is claimed is:

1. An electrical junction box comprising:
   a screw-tightening type fusible link having at least one pair of terminals;
   a first electrical junction box having a housing for mounting the screw-tightening type fusible link and a recess portion which is adjacent to the housing for mounting the screw-tightening type fusible link;
   a second electrical junction box which can be mounted in the recess portion of the first electrical junction box;
   at least one wire harness in which one end of the wire harness is securely tightened to the terminal of the screw-tightening type fusible link by a bolt; and
   an operation space for tightening the bolt, the operation space being defined so as to be identical with the recess portion of the first electrical junction box before the second electrical junction box is mounted.

2. The electrical junction box as set forth in claim 1 further comprising:
   at least one housing disposed on a top face of said first electrical junction box for mounting a fusible link used for a load; and
   at least one bus bar disposed inside the first electrical junction box for connecting the terminal of the screw-tightening type fusible link with the housing for mounting the fusible link used for the load,
   wherein the housing for mounting the screw-tightening type fusible link is disposed in a configuration such that the bus bar is shaped so as to be straight or so as to be bent at only one point.

3. The electrical junction box as set forth in claim 1, wherein said first electrical junction box and said second electrical junction box each have at least one housing for mounting a relay.

4. The electrical junction box as set forth in claim 1, wherein said screw-tightening type fusible link and said second electrical junction box are electrically connected to each other.

5. An electrical junction box comprising:
   a screw-tightening type fusible link having at least one pair of terminals;
   a first electrical junction box having a housing for mounting the screw-tightening type fusible link and a recess portion which is adjacent to the housing for mounting the screw-tightening type fusible link;
   a plurality of first wire harnesses connected to the first electrical junction box;
   a second electrical junction box which can be mounted in the recess portion of the first electrical junction box;
   a plurality of second wire harnesses connected to the second junction box;
   at least one third wire harness in which one end of the third wire harness is securely tightened to the terminal of the screw-tightening type fusible link by a bolt; and
   an operation space for tightening the bolt, the operation space being defined so as to be identical with the recess portion of the first electrical junction box before the second electrical junction box is mounted.

6. The electrical junction box as set forth in claim 5 further comprising:
   at least one housing disposed on a top face of said first electrical junction box for mounting a fusible link used for a load; and
   at least one bus bar disposed inside the first electrical junction box for connecting the terminal of the screw-tightening type fusible link with the housing for mounting the fusible link used for the load,
   wherein the housing for mounting the screw-tightening type fusible link is disposed in a configuration such that the bus bar is shaped so as to be straight or so as to be bent at only one point.

7. The electrical junction box as set forth in claim 5, wherein said first electrical junction box and said second electrical junction box each have at least one housing for mounting a relay, the housing mounting the relay of the first electrical junction box being connected with at least one of said first wire harnesses, and the housing for mounting the relay of the second electrical junction box being connected with at least one of said second wire harnesses.

8. The electrical junction box as set forth in claim 5, wherein the other end of said third wire harness is connected to said second electrical junction box as one of said plurality of second wire harnesses.

* * * * *